(12) United States Patent
Liu et al.

(10) Patent No.: US 7,721,532 B2
(45) Date of Patent: May 25, 2010

(54) METHOD AND SYSTEM FOR REGENERATION OF A CATALYST

(75) Inventors: Ke Liu, Rancho Santa Margarita, CA (US); Jonathan Lloyd Male, Schoharie, NY (US); Arnaldo Frydman, Santa Ana, CA (US); Roy James Primus, Niskayuna, NY (US); Vladimir Zamansky, Oceanside, CA (US); Teresa Grocela Rocha, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 920 days.

(21) Appl. No.: 11/172,642

(22) Filed: Jun. 30, 2005

(65) Prior Publication Data
US 2007/0000239 A1 Jan. 4, 2007

(51) Int. Cl.
*F01N 3/00* (2006.01)
(52) U.S. Cl. ............................. 60/286; 60/274; 60/287; 60/292; 60/295; 60/297; 60/301; 60/303
(58) Field of Classification Search ............... 60/285, 60/286, 287, 295, 299, 300, 301, 303, 274, 60/288, 292, 297
See application file for complete search history.

(56) References Cited

U.S. PATENT DOCUMENTS

| 5,829,248 A | 11/1998 | Clifton | |
|---|---|---|---|
| 6,691,509 B2 * | 2/2004 | Hoffman et al. | 60/286 |
| 6,729,125 B2 * | 5/2004 | Suga et al. | 60/285 |
| 6,823,660 B2 * | 11/2004 | Minami | 60/280 |

FOREIGN PATENT DOCUMENTS

| EP | 0540280 | 5/1992 |
|---|---|---|
| EP | 1484103 | 12/2004 |

* cited by examiner

*Primary Examiner*—Binh Q Tran
(74) *Attorney, Agent, or Firm*—Fletcher Yoder

(57) ABSTRACT

The disclosed embodiments relate to a method and system for regeneration of a catalyst. The system includes an engine that creates an exhaust stream and a fuel supply adapted to supply a fuel stream to the engine. A reactor includes a catalyst and is in fluid communication with the engine to receive the exhaust stream. A sensor senses a system parameter and produces a signal corresponding to the system parameter. A controller receives the signal and directs at least a portion of the exhaust stream or at least a portion of the fuel stream to the catalyst to control a regeneration operation based on a value of the system parameter sensed by the sensor.

33 Claims, 4 Drawing Sheets

METHOD AND SYSTEM FOR REGENERATION OF A CATALYST

BACKGROUND

The present invention relates to a system and a method for improving performance of an exhaust gas after-treatment system, and more particularly to regenerating a catalyst to improve its NOx conversion efficiency.

Current emission control regulations necessitate the use of catalysts in the exhaust systems of automotive vehicles in order to convert carbon monoxide (CO), hydrocarbons (HC), and nitrogen oxides (NOx) produced during engine operation into harmless exhaust gasses. Vehicles equipped with diesel or lean gasoline engines offer the benefit of increased fuel economy. Such vehicles can benefit from exhaust after-treatment systems that employ one or more catalysts to assist in chemically converting NOx, hydrocarbons, carbon monoxide, and other pollutants into less harmful compounds prior to discharge of the exhaust to the environment.

However, in such traditional catalyst systems, soot, hydrocarbons, and other undesirable species may adsorb on the surface of the catalyst, thus contaminating the catalyst and reducing its conversion efficiency. Periodically heating the catalyst systems to a temperature above the boiling point of hydrocarbons, or the regeneration temperature of soot, for a predetermined amount of time, can regenerate the catalyst by removing deposits of undesirable materials.

Known methods of regeneration may involve complex operations such as switching many streams of exhaust and activating many valves. Such systems employ complex subsystems such as cooling fans, multiple catalyst beds, and the like. Additionally, these systems also require valuable space, materials and additional fuel consumption. Therefore, there is need for an improved system and method for regeneration of catalysts.

BRIEF DESCRIPTION

Briefly, in accordance with one embodiment of the invention, there is provided a system for regeneration of a catalyst. The system includes an engine that creates an exhaust stream, a fuel supply adapted to supply a fuel stream to the engine, a reactor that includes a catalyst and is in fluid communication with the engine to receive the exhaust stream and a sensor that senses a system parameter and produces a signal corresponding to the system parameter. The system also includes a controller that receives the signal and directs at least a portion of the exhaust stream or at least a portion of the fuel stream to the catalyst to control a regeneration operation based on a value of the system parameter sensed by the sensor. As used herein, the term "regeneration operation" may refer to a complete regeneration or a change of operational parameters or conditions during regeneration. Thus, the term "regeneration operation" is intended to be broad enough to encompass portions of a complete regeneration. In one embodiment of the invention, the regeneration operation may signify only the beginning a regeneration cycle. In another embodiment of the invention, the regeneration operation may signify an end of a regeneration cycle. In yet another embodiment of the invention, the regeneration operation may signify mean and controlling the temperature of a catalyst.

In accordance with another embodiment of the invention, there is provided a method for regeneration of a catalyst. The method includes supplying a fuel stream to an engine and generating an exhaust stream from the engine, wherein the exhaust stream is generated by burning at least a portion of the fuel stream. The method also includes passing the exhaust stream over a reactor that includes a catalyst and is in fluid communication with the engine and sensing a system parameter and producing a signal corresponding to the system parameter. The method further includes receiving the signal and directing at least a portion of the exhaust stream or at least a portion of the fuel stream to the catalyst to control a regeneration operation based on a value of the system parameter sensed

DRAWINGS

DETAILED DESCRIPTION

Figure 1:
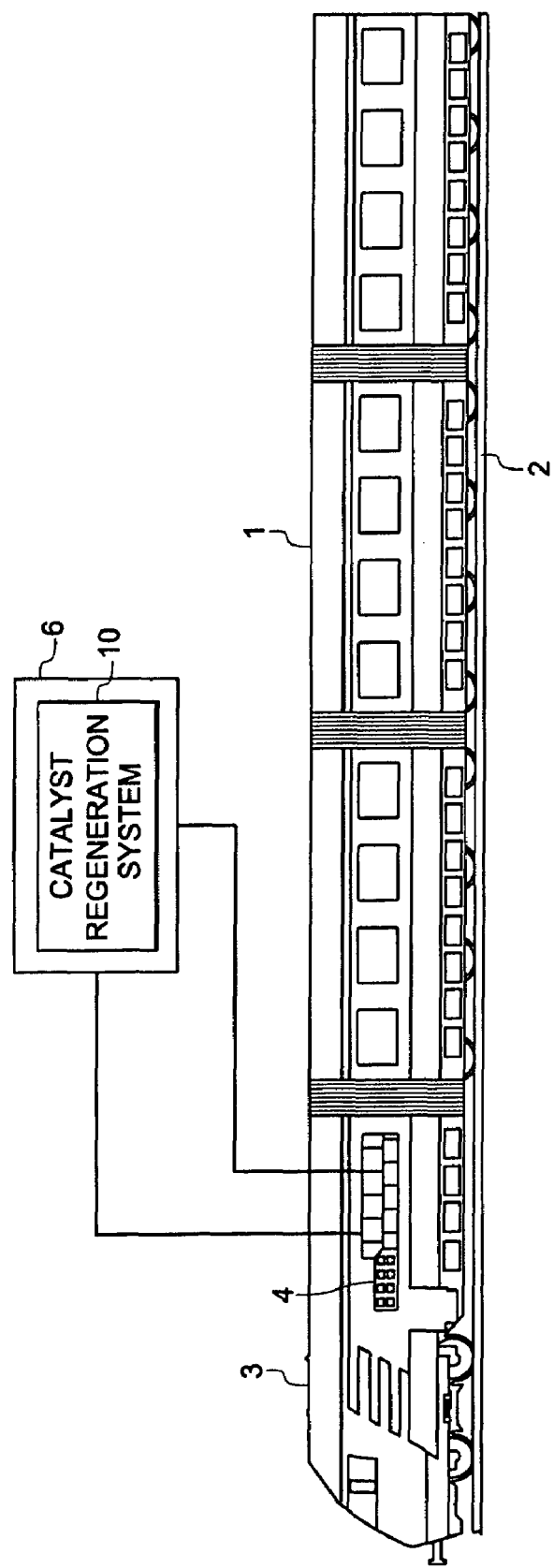
FIG. 1 is a schematic diagram of a locomotive engine that uses a system in accordance with the present technique for regeneration of catalyst.

FIG. 1 is a schematic diagram of a railroad locomotive that uses an exemplary system for regeneration of catalyst in a diesel engine exhaust treatment system in accordance with one embodiment of the present technique. A train 1 runs on a rail 2. A locomotive 3 includes a diesel engine 4 to drive the train 1. The locomotive 3 is equipped with an exhaust treatment system 6 to treat the exhaust coming out from the engine 4. The exhaust treatment system 6 includes catalyst used for exhaust treatment. The locomotive 3 also includes a system 10 for regeneration of the catalyst in exhaust treatment system 6. Although FIG. 1 shows a locomotive, those of ordinary skill in the art will appreciate the applicability of the present technique to other systems that employ catalyst. For example, the present technique may be employed in other vehicles that have combustion engines, such as passenger vehicles, buses, ships, off-road vehicles, stationary devices such as generators and boilers or the like.

According to an exemplary embodiment of the present technique, vehicles equipped with diesel or lean gasoline engines offer the benefit of increased fuel economy. Such vehicles typically produce pollutant gases such as carbon monoxide (CO), hydrocarbons (HC), nitrogen oxides (NOx) and the like during engine operation. Emission control regulations encourage the use of catalyst in the exhaust treatment systems of vehicles in order to convert these pollutant gases into harmless exhaust gasses. In one embodiment of the invention, these engines, therefore, may be equipped with exhaust treatment systems that include after-treatment devices such as a Selective Catalytic Reduction (SCR) catalyst, in which NOx is continuously removed by reacting NOx with active reductants to produce $N_2$. Such reductants may include hydrocarbon compounds. In another embodiment of the invention, a typical exhaust treatment system may also include a conversion catalyst coupled upstream of the SCR catalyst to convert hydrocarbons and carbon monoxide in the exhaust gas mixture.

Typically, soot, sulfur containing compounds and unreduced hydrocarbons adsorb on the surface of the catalyst during operation of the engine. The adsorbed species insulate the active surface of the catalyst from the exhaust stream, thereby reducing the efficiency of the catalyst. Therefore, there is usually a need to periodically heat the catalyst systems to a temperature above the boiling point of hydrocarbons or above the temperature at which soot can be "burned off" of the catalyst, for a predetermined amount of time, to clean the surface of the catalyst. This process is known as "regenerating" the catalyst.

In order to ensure satisfactory operation of the system, regular regeneration helps to reduce the risk of uncontrolled exothermic regeneration. Desirably efficient operation is often obtained when the exhaust gases or the reactor in which the combustion of soot is to occur are at a temperature in excess of 300° C. for at least 30% of the operating time of the vehicle. Because maintaining the catalyst in a desirable range consumes energy, the regeneration system should be as fuel efficient as possible. Moreover, regeneration of catalyst should occur at a time when the catalyst is not performing its primary function, such as, for example, producing a reductants to be used for pollution removal downstream, or for converting NOx to nitrogen.

Effective regeneration of catalysts can be done in accordance with the requirements described above by performing regeneration of the catalyst while an engine is set at the operating level referred to as "notch 2" (for a locomotive application) by those of ordinary skill in the art. In one aspect of the present technique, the exhaust from the engine operating at notch 2 is used for the purpose of regeneration. In yet another embodiment of the invention, the injection timing of fuel in the engine is altered for the purpose of regeneration. Notice that, for the locomotive example, there is no need of $NO_x$ control at notch 2 or below, so whenever the locomotive operates at notch 2, it may be opportunistic to regenerate the catalyst (both the fuel conversion catalyst as well as the SCR catalyst).

Figure 2:
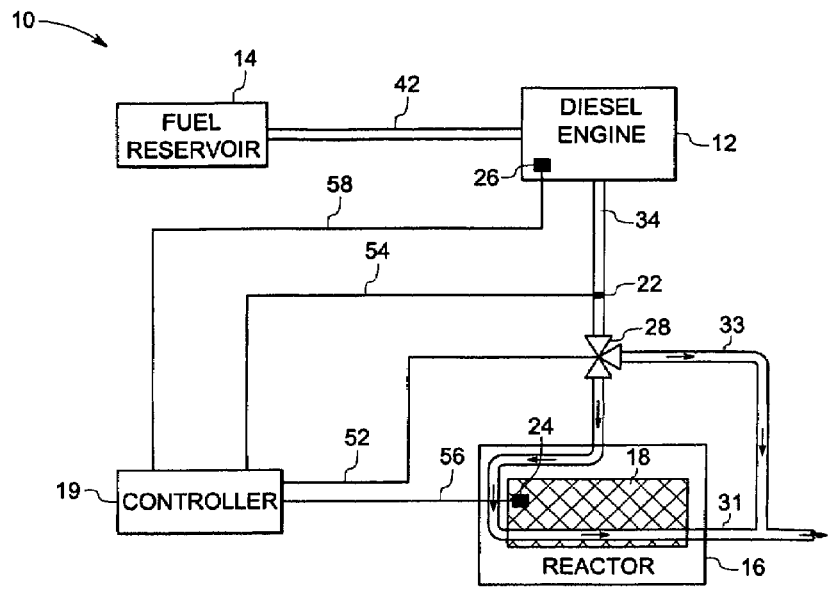
FIG. 2 is a schematic diagram of an exemplary system for regeneration of catalyst in an engine exhaust treatment system in accordance with one embodiment of the present technique.

FIG. 2 is a schematic diagram of an exemplary system 10 for regeneration of catalyst in an exhaust treatment system 6 present in a typical internal combustion engine in accordance with aspects of the present technique. Referring to FIG. 2, an internal combustion engine 12, supplied with fuel from a main reservoir 14 via a supply system 42, produces exhaust gases during operation. These gases are recovered using a manifold (not shown) at the outlet of the engine, and are discharged through a discharge line 34. The system 10 includes a temperature sensor 22 disposed in the discharge line 34 to measure the temperature inside the discharge line 34. The discharge line 34 supplies the exhaust stream to a reactor 16 containing a catalyst 18. Catalyst 18, in one exemplary embodiment is a fuel conversion catalyst. A temperature sensor 24 is also placed in the reactor 16 to sense the temperature of the catalyst 18. The system 10 also includes an engine notch level sensor 26 coupled to and positioned near engine 12 for sensing the notch level of the engine. Those of ordinary skill in the art will appreciate that the desirability of performing regeneration at notch 2 is that when the locomotive operates at notch 2, the NOx level is low, and there is no need to run the fuel converter to generate the NOx reductant during this period, which provides the opportunity to regenerate the catalyst. Since no hydrocarbons are sent to the SCR catalyst, with the hot O2 containing exhaust flow through the SCR, it can also burn all the hydrocarbons deposited on the SCR catalyst if hydrocarbons have been injected into the SCR catalyst for NOx reduction.

The discharge line 34 in the regeneration system 10 branches out in two lines on reaching the reactor 16. One reactor heating line 31 carries a part of the exhaust stream, passes through the reactor 16 and directs at least a portion of the exhaust stream over the catalyst 18. The other branch of the discharge line 34, the bypass exhaust line 33, bypasses the reactor 16 and directs the remaining part of the exhaust stream out of the engine. A flow control valve 28 is disposed in the discharge line 34 at the junction of the reactor heating line 31 and the bypass exhaust line 33. The flow control valve 28 selectively diverts part of the exhaust stream into the reactor heating line 31. A controller 19 is connected to the flow control valve 28 by command line 52. The controller 19 monitors and controls the opening and closing of the valve 28. The flow control valve 28 is typically a solenoid valve and opening and closing of the solenoid valve leads to the more or less volume flow of exhaust stream into the reactor heating line 31 and thereby in the reactor 16.

The reactor 16 as shown in FIG. 2 is typically made of a stainless steel casing (not shown), a thermal insulator (not shown) and honeycomb or foam support (not shown) impregnated with noble metals. The reactor 16 is typically manufactured by coating the support with a metal or ceramic material with a high surface area, such as metal oxide particles. The material of the catalyst 18 is deposited on the high surface area material of the reactor 16. In the formation of such a reactor, a sintered, dense and hardened ceramic substrate, which can be in the shape of a honeycomb, random shaped pore openings, wagon-wheel, spiral, pellets or the like, is coated with a slurry of a high surface area material. The catalyst is then applied to the slurry-coated substrate, typically by application of a solution of a salt.

In some embodiments, the catalyst 18 described in this embodiment comprises one or more noble metals, such as platinum or rhodium. In another embodiment, the catalyst 18 is a transition metal-exchanged zeolite. Typically, the catalyst is capable of selectively reducing nitrogen oxides with hydrocarbons in the presence of oxygen so that at least about 30% of the nitrogen oxides are converted. More preferably, this amount is at least about 50%, under the operating temperatures of the engine 12. Referring again to FIG. 2, in particular embodiments, the nitrogen oxides contained in the exhaust gases is converted by the catalyst 18 into nitrogen.

In one embodiment of the invention a slip stream of the exhaust goes to the fuel conversion catalyst for regeneration (not all the exhaust stream). This slip exhaust stream is sent to the fuel conversion catalyst from upstream of the turbocharger turbine since it is hotter before the turbine. The full exhaust stream does go to the HC-SCR catalyst but this is downstream of the turbine and cooler. The regeneration stream from the fuel conversion catalyst flows through the HC-SCR catalyst. Heat from the regeneration stream from the fuel conversion catalyst can help heat the HC-SCR catalyst. If the heat is not enough, one may burn additional fuel or use electrical heaters to further heat the HC-SCR catalyst bed in order to completely regenerate the SCR catalyst.

In one embodiment, the reactor 16 and thereby the fuel conversion catalyst 18 are heated up by contact with high temperature exhaust gases from the engine 12. To successfully assist the regeneration, the temperature of the gases may exceed about 200-350 degrees C. This heating, in conjunction with the exothermic nature of the oxidation reaction from burning the coke off the catalyst 18, will bring the catalyst to light-off temperature. Referring again to FIG. 2, a controller 19 controls and coordinates the activities of the sensors 22, 24 and 26 and the flow control valve 28 to coordinate the overall functioning of the system 10. These sensors are employed to measure a system parameter (in this exemplary case, temperature or pressure of the catalyst bed) and produce a signal corresponding to the system parameter. The controller 19 receives the signal and directs the exhaust stream to the catalyst if the system parameter is indicative of a need for regeneration.

As will be recognized by those of ordinary skill in the art, the controller 19 may be embodied in several other ways. In one embodiment, the controller 19 may include a logical processor (not shown), a threshold detection circuitry (not shown) and an alerting system (not shown). Typically, the logical processor is a processing unit that performs computing tasks. It may be a software construct made up using software application programs or operating system resources. In other instances, it may also be simulated by one or more physical processor(s) performing scheduling of processing tasks for more than one single thread of execution thereby simulating more than one physical processing unit. The controller 19 aids the threshold detection circuitry in estimating an emission parameter such as NOx efficiency, HC efficiency or CO efficiency based on the strength of the exhaust from the engine 12. This estimate information may be reported to a remote control unit (not shown) or to an alerting system (not shown) whether the catalyst is regenerated completely.

The primary indicator of need for regeneration is but not limited to the temperature of the catalyst 18. In operation, controller 19 monitors and controls the temperature of the reactor 16. In one embodiment, the controller 19 determines and interprets the temperature of the reactor bed 16 based on the temperature sensing signals from the temperature sensors 24 disposed in the reactor bed 16. The determination and interpretation by the controller 19 is done in accordance with a predetermined criterion. For instance, in one embodiment, the predetermined criterion may include a binary comparison of the temperature of the reactor bed 16 with a predetermined reference value of temperature. In another embodiment, the predetermined criterion may comprise comparison of the temperature of the reactor bed 16 with a predetermined maximum value of temperature. In yet another embodiment, the predetermined criterion may comprise comparison of the temperature of the reactor bed 16 with a predetermined minimum value of temperature.

Whatever the criterion for comparison, if the sensed temperature of the reactor bed 16 falls outside of the predetermined reference range, the controller 19 may determine that the status of the catalyst 18 is not acceptable and the reactor 16 needs extra heating. In that event, the controller 19 sends a command signal to the flow control valve 28 and regulates the opening of the flow control valve 28 so that an additional amount of exhaust stream is diverted into the reactor heating line 31. In another embodiment, if the controller 19 senses that the reactor 16 needs extra heating, it sends an alarm signal to the alerting system and the alerting system in turn generates an appropriate alarm to a process observer at a remote location (not shown. Note that one can use a thermocouple to monitor the temperature of the fuel conversion catalyst bed to determine if the regeneration is complete or not. For example, after the coke-burning reaction is lit-off, the temperature of the fuel conversion catalyst will increase until most of the coke is burned-off, there is not enough heat released, so the temperature will start to drop. After all the coke burned-off, the catalyst bed temperature will come back to the exhaust temperature.

Figure 3:
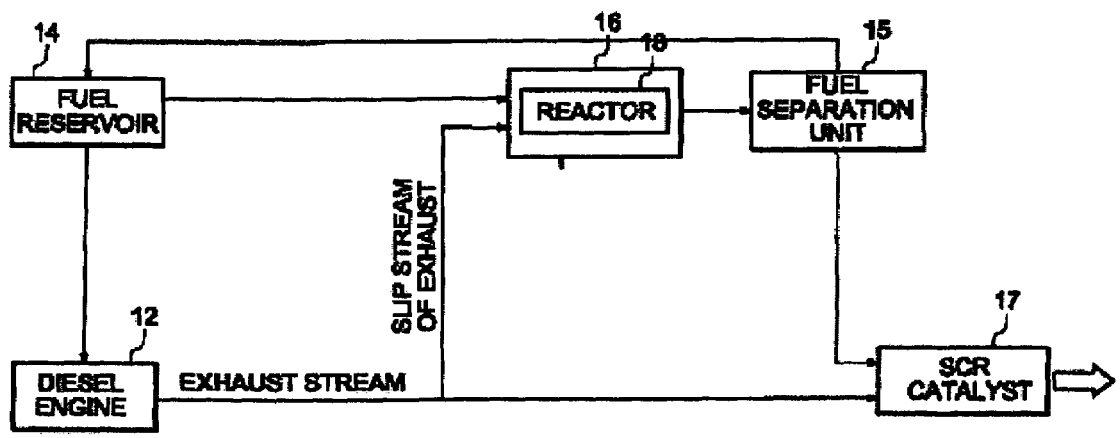
FIG. 3 is a schematic diagram of a fuel regeneration system in accordance with one embodiment of the present technique.

FIG. 3 is a schematic diagram of a fuel regeneration system as implemented in an engine 12 in accordance with aspects of the present technique. Those components in system 10 of FIG. 2 that are identical to components of FIG. 3 are identified using the same reference numerals used in FIG. 2. In addition to the components of system 10, the fuel regeneration system in FIG. 3 contains a fuel separation unit 15 and a second catalyst 17 (e.g. NOx HC-SCR). The engine 12 gets its fuel supply from the fuel reservoir 14. The fuel stored in the fuel reservoir is typically thickened by recycling the aromatic compounds present therein as illustrated in FIG. 3. Fuel flows from the fuel reservoir 14 to the fuel separation unit 15 where the aromatic compounds present in the fuel get separated from the heavy compounds. The heavy compounds may typically include substances such as paraffin, olefins and the like. A typical membrane mechanism (not shown) deployed inside the fuel separation unit 15 allows the separation between the aromatic compounds and the heavy compounds to occur. The heavy compounds flow on to the reactor 16 downstream and are treated there as explained above in relation to FIG. 2. The aromatic compounds on the other hand are pumped back to the fuel reservoir 14. This way, diesel in the fuel reservoir 14 is thickened with aromatic compounds over time and the thickened diesel flows to the diesel engine 12 for combustion.

Continuing to refer to FIG. 3, an exhaust stream comes out from the diesel engine 12 as a result of the combustion process. One part of the exhaust stream, referred to as 'slip stream of the exhaust' (or alternatively a portion of the slip stream) is diverted to the reactor 16. The heat carried by the slip stream of the exhaust heats up the reactor 16. The catalysts 18 and the heavy compounds present in the reactor 16 are treated for regeneration as explained above. The other part of the exhaust stream is carried to the second catalyst 17 for its regeneration treatment. In one embodiment of the invention, the slip stream of the exhaust, after its exit from the reactor 16, may also be carried to the second catalyst 17. The slip stream of the exhaust thus carried to the second catalyst 17 supplies additional heat that may be required for the regeneration of the second catalyst 17. The combined exhaust stream is let out after the regeneration treatment of second catalyst 17.

The second catalyst 17 typically, but not necessarily, comprises a noble metal such as, for example palladium. The second catalyst may comprise one or more of a number of catalyst types, including, for instance, an SCR catalyst, a catalyst for reduction of hydrocarbon species, or a hybrid catalyst made of a number of various types of catalysts. A second catalyst temperature sensor 25 is also placed in the F 16. The function of the sensor 25 is to measure the temperature in the vicinity of the second catalyst 17. The controller 19 is connected to the sensor 25 by the sensing signal line 57.

In typical dual bed catalytic reactor systems commonly found in prior art, one bed regenerates while the other one performs its primary function. Such systems employ complex subsystems such as cooling fans and the like. Additionally, these systems also require valuable space and additional fuel consumption. Moreover, these traditional dual bed systems are complex and expensive to operate. In contrast, in this embodiment, both the catalyst 18 and the second catalyst 17 can be regenerated using the exhaust gases from the engine 12, whenever there is no need to inject feed to the catalyst 18 hence there is no hydrocarbon reductants feeding into the catalyst 17. During this period, only hot exhaust contains O2 passes through both catalysts. Moreover, the system as illustrated in this embodiment of the invention, is simple, easy to deploy and economic in fuel utilization. In another embodiment of the invention the reactor heating line 31 may further branch out inside the reactor 16 in two lines (not shown) to supply different volume flow of the exhaust stream to the two different catalysts.

If the both catalyst temperatures are too low for regeneration, in one exemplary embodiment small amounts of fuel are injected into the hybrid catalyst in order to oxidize and generate additional heat in the exhaust stream in order to raise the temperature of the gas stream needed for regeneration of both the catalysts. The temperature of the second catalyst 17 is continuously monitored by the controller 19 using the temperature sensor 25. The controller 19 also controls the operational parameters of the engine 12 so that the temperature of the second catalyst 17 remains above the regeneration point.

Various methods may be used, where needed, for raising the temperature of the second catalyst 17, during the regeneration period such as by the heat of coke combustion on the fuel conversion catalyst or by injecting small amount of fuel to the fuel conversion catalyst or the SCR catalyst during the regeneration period when the O2 and steam contained hot exhaust flows through the catalysts.

In another alternative embodiment, a reductant delivery system may be used to increase the hydrocarbon concentration in the exhaust gas mixture in discharge line 34 that enters the reactor 16 to interact with the catalyst 18. Alternatively, in yet another embodiment, the amount of NOx in the exhaust gas mixture entering the second catalyst 17 can be estimated based on engine speed, load, exhaust gas temperature or any other parameter known to those skilled in the art to affect engine NOx production. A suitable method may be adopted in this embodiment to supply extra hydrocarbon as described above in case of any such requirement. Referring back to FIG. 3, in yet another embodiment, the catalyst 18 and the second catalyst 17 described above may be combined physically and functionally into a hybrid catalyst. The material of the hybrid catalyst, in some embodiments, may be an intimate mixture of the catalyst 18 and the second catalyst 17 or a layered combination of them.

Figure 4:
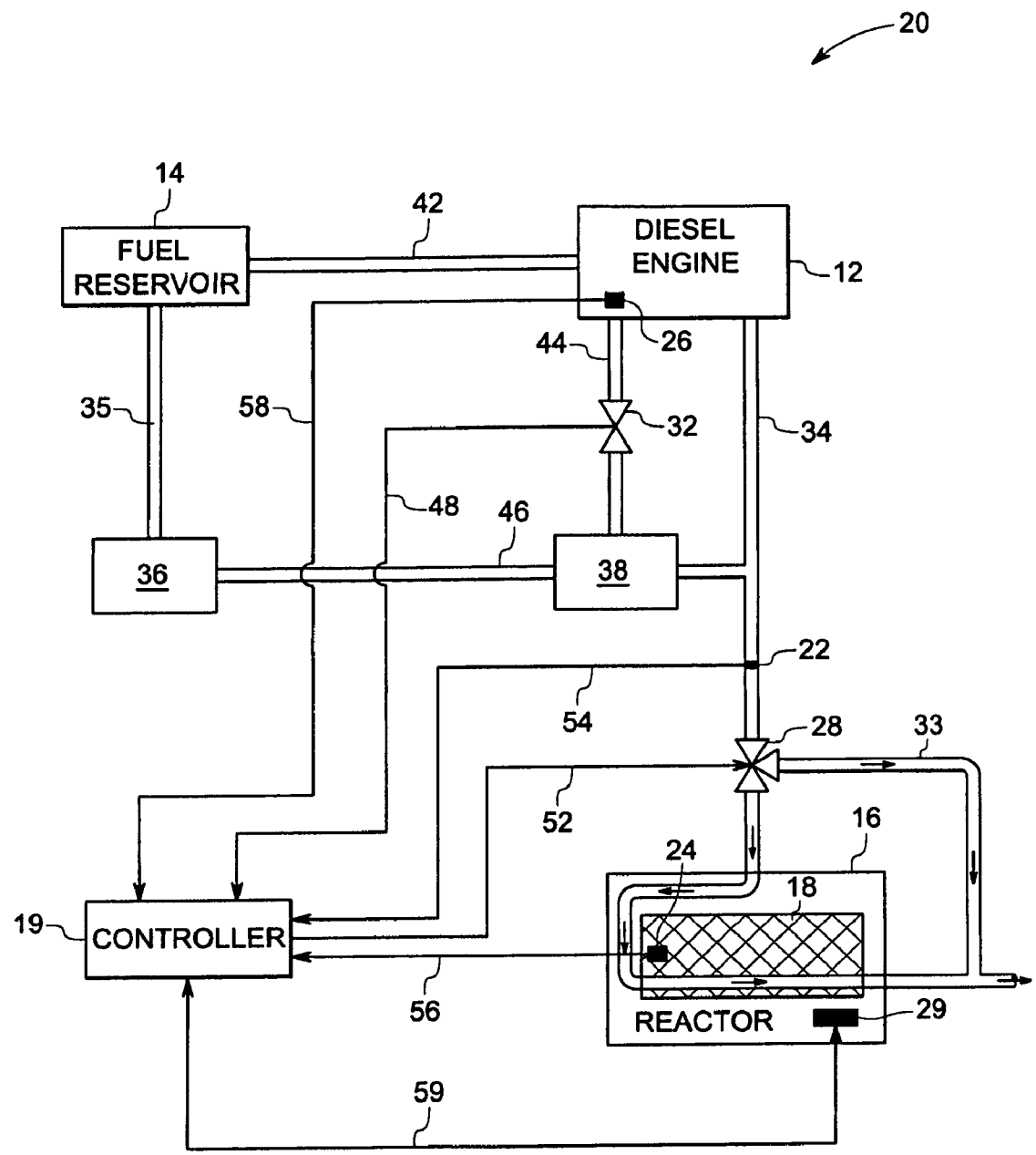
FIG. 4 is a schematic diagram of an exemplary system for regeneration of catalyst in an engine exhaust treatment system in accordance with one embodiment of the present technique.

As will be appreciated by those of ordinary skill in the art, embodiments of the present technique are not limited to the above-described configuration of the system. FIG. 4 is a schematic diagram of another exemplary system for regeneration of catalyst in a diesel engine exhaust treatment system. Those components in system 20 that are identical to components of system 10 of FIG. 2 or FIG. 3 are identified in FIG. 4 using the same reference numerals used earlier. In addition to the components of system 10, the system includes a fuel injection control valve 32 to control the amount of fuel injected into the combustion chamber of the engine. The control valve 32 is connected to the controller 19 by command line 48. The controller 19 monitors and controls the opening of the control valve 32. Moreover, the reactor 16 in system 20 of FIG. 4 further includes a heating element 29. The structure and function of this extra heating element will be described in more details below.

It would be appreciated by one skilled in the art that at least a portion of a fuel stream may be injected to both catalyst 17 and catalyst 18 or alternatively only to catalyst 17 for a few seconds to heat up one or both of the catalysts.

Referring to FIG. 4 again, in one embodiment of the invention, an extra heating element 29 is provided to the reactor 16 to shorten or avoid the light-off time. The extra heating element 29 may comprise devices such as burners, electrical resistors or the like. In one embodiment, the heating element is an electrically heated cylindrically shaped heating element. Alternatively, in another embodiment, the heating element may be rectangular shaped to increase its surface contact area with the reactor 16 and the catalyst 18. Controller 19 can selectively enable and disable switching of the heating element 29 by command line 59 depending on various operating conditions, such as engine speed, load, exhaust gas temperature and the like. Similarly, an additional heating source might be applied to the catalyst 17.

The secondary reservoir 36 supplies the injection chamber 38 with diesel fuel through fuel supply line 46 to injection chamber 38. The secondary reservoir 36 is itself supplied from the main reservoir 14 through a pipe system 35. The secondary fuel supply line 44 connects the engine 12 to the injection chamber 38. The lines 44 are opened using the solenoid valves 28 and 32. The controller 19 as shown in FIG. 4 is enhanced over its configuration discussed in relation to FIG. 2 by incorporating the additional functionality of controlling the amount of fuel entering the diesel engine 12. In one embodiment, the controller 19 controls the amount of fuel carried to the engine 12 for combustion through the fuel injection line 44 by controlling the opening and closing the fuel injection valve 32. The controller 19 communicates with the fuel injection valve 32 by the command line 48 to achieve the control of the above descried fuel injection valve 32. In another embodiment, the controller 19 is equipped with a timer (not shown) to monitor and control the amount of fuel injected into the combustion chamber by indirectly controlling the duration of injection.

In operation, if the measured temperature of the reactor bed 16 is less than or equal to a reference value, the controller 19 coordinates the opening of the flow control valves 28 and 32. Opening of flow control valve 32 leads to more fuel injected into the engine and extra combustion takes place in the combustion chamber (not shown) of engine 12. At the same time, opening of flow control valve 28 leads to more volume flow of exhaust stream in the reactor heating line 34. Thus, by sensing the two temperature sensors 22 and 24 and by operating the flow control valves 28 and 32 in tandem, the controller 19 facilitates complete regeneration of the catalyst 18 in the reactor bed 16.

Figure 5:
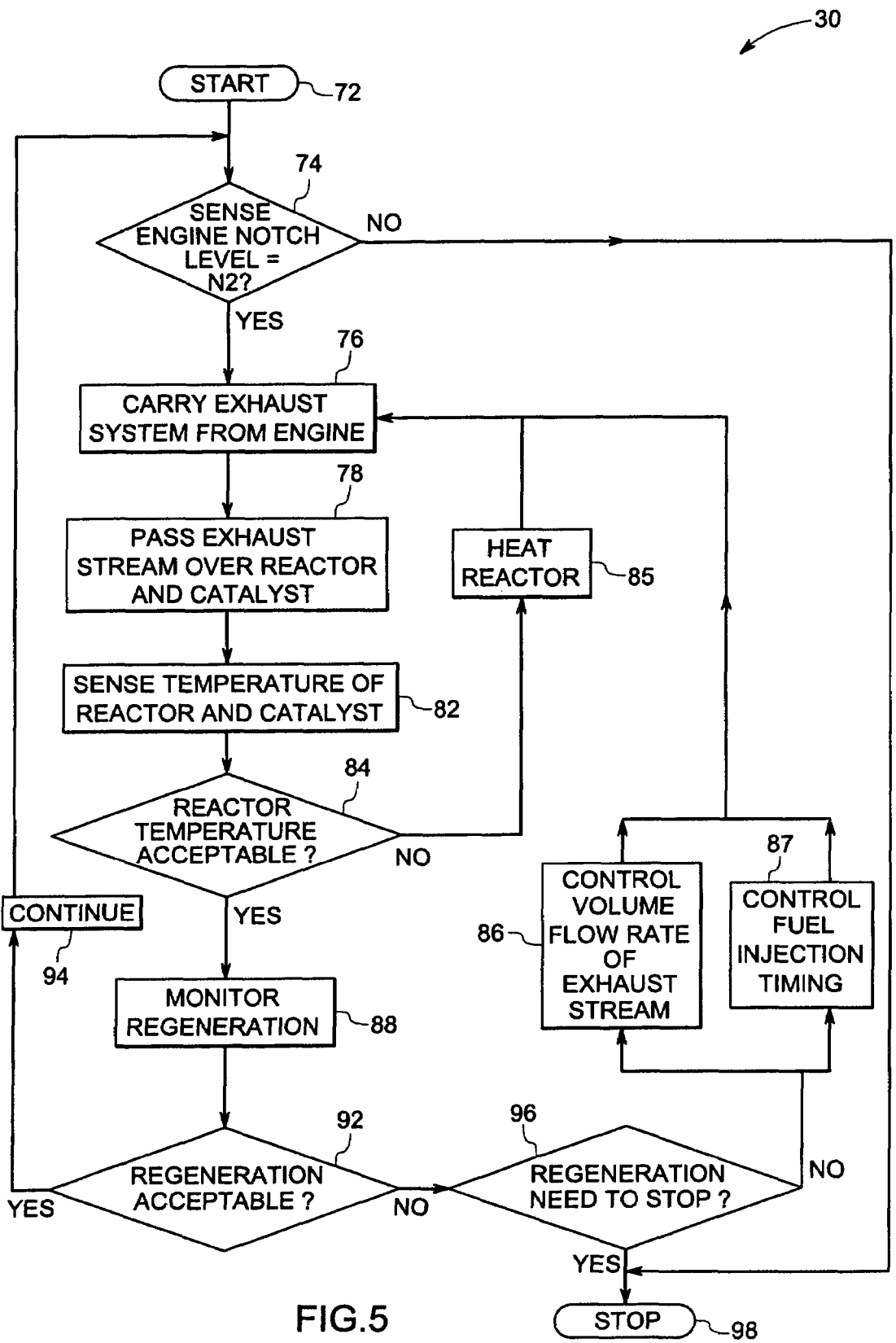
FIG. 5 is a flow chart that shows a process for regeneration of catalyst in accordance with one embodiment of the present technique.

FIG. 5 is an exemplary method flow chart for regeneration of catalyst in a diesel engine exhaust treatment system in accordance with aspects of the present technique. An exemplary routine for catalyst regeneration as explained in FIG. 5 in accordance with aspects of the present technique is presented. As will be appreciated by one of ordinary skill in the art, the routine may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

The method of regeneration of catalyst starts as in functional block 72. The operating engine notch level is sensed as in functional block 74 and once the notch level 2 is reached, exhaust stream from the engine is carried out to the regeneration system as in functional block 76. The exhaust stream is passed over the reactor and the catalyst as in functional block 78. The temperature sensors embedded in the reactor and the catalyst sense the temperature of reactor and catalyst as in functional block 82. The reactor temperature is monitored by the controller 19 as in functional block 84. If necessary, the reactor is heated as in functional block 85. At the same time, the volume flow rate of exhaust stream is monitored and controlled as in functional block 86. In another embodiment, the fuel injection timing is monitored and controlled as in functional block 87. The regeneration of the catalyst is monitored and controlled as in functional block 88 and it is verified whether the regeneration process is acceptable or not as in functional block 92. If it is acceptable, regeneration of the catalyst is continued as in functional block 94. On the other hand, if the regeneration process is not acceptable, it is verified whether regeneration is to be stopped altogether as in functional block 96. If not, then the control goes back to the functional blocks 86 and 87, whereby the volume flow rate of exhaust stream and the fuel injection timing are monitored and controlled. On the other hand, if regeneration is stopped, the method 30 of catalyst regeneration in accordance with one embodiment of this invention comes to an end as in functional block 98.

Therefore, according to aspects of the present technique, it is possible to improve NOx conversion efficiency of a catalyst by removing stored contaminants, such as hydrocarbons and soot, from its storage sites. This can be accomplished by a regeneration process wherein the temperature of the catalyst is maintained above a predetermined temperature for a sufficient amount of time to boil off adsorbed hydrocarbons and remove soot deposits.

The principles of the invention are not limited to only railroad locomotive engines. One of ordinary skill will recognize that other embodiments of the invention are suited for other types of vehicles that use internal combustion engines. For example, internal combustion engines used in vehicles that run on roads such as municipal transport vehicles or city buses or passenger vehicles or in ships may be installed with this type of regeneration systems. In fact, the gases produced by these vehicles are generally at a temperature below that necessary in order to allow regeneration of conventional catalysts, which leads to clogging of these catalysts and therefore their rapid deterioration owing to vigorous combustion reactions. Existing systems, however, generally use organo-metallic additives in order to catalyze the particle combustion, which may lead to a significant operating cost. The device according to the invention, associated with its regeneration method, makes it possible to overcome this problem of cost, and no additional reagents are required.

While only certain features of the invention have been illustrated and described herein, many modifications and changes will occur to those skilled in the art. It is, therefore, to be understood that the appended claims are intended to coverall such modifications and changes as fall within the true spirit of the invention.

The invention claimed is:

1. A system for regeneration of a catalyst, comprising:
an engine that creates an exhaust stream, wherein the engine comprises a diesel engine;
a fuel supply adapted to supply a fuel stream to the engine;
a reactor that includes a catalyst and is in fluid communication with the engine to receive the exhaust stream;
a sensor that senses a system parameter and produces a signal corresponding to the system parameter; and
a controller that receives the signal and directs at least a portion of the exhaust stream or at least a portion of the fuel stream to the catalyst to control a regeneration operation based on a value of the system parameter sensed by the sensor.

2. A system for regeneration of a catalyst, comprising:
an engine that creates an exhaust stream;
a fuel supply adapted to supply a fuel stream to the engine;
a reactor that includes a catalyst and is in fluid communication with the engine to receive the exhaust stream;
a sensor that senses a system parameter and produces a signal corresponding to the system parameter; and
a controller that receives the signal and directs at least a portion of the exhaust stream or at least a portion of the fuel stream to the catalyst to control a regeneration operation based on a value of the system parameter sensed by the sensor, wherein the regeneration operation comprises at least one of: beginning a regeneration cycle, ending a regeneration cycle and controlling the temperature of a catalyst.

3. A system for regeneration of a catalyst, comprising:
an engine that creates an exhaust stream;
a fuel supply adapted to supply a fuel stream to the engine;
a reactor that includes a catalyst and is in fluid communication with the engine to receive the exhaust stream;
a sensor that senses a system parameter and produces a signal corresponding to the system parameter;
a flow control apparatus configured to control an amount of the exhaust stream delivered to the catalyst; and
a controller that receives the signal and directs at least a portion of the exhaust stream or at least a portion of the fuel stream to the catalyst to control a regeneration operation based on a value of the system parameter sensed by the sensor.

4. The system according to claim 1 wherein the system parameter comprises a notch level of the engine.

5. The system according to claim 4 wherein the notch comprises notch two.

6. A system for regeneration of a catalyst, comprising:
an engine that creates an exhaust stream;
a fuel supply adapted to supply a fuel stream to the engine;
a reactor that includes a catalyst and is in fluid communication with the engine to receive the exhaust stream;
a sensor that senses a system parameter and produces a signal corresponding to the system parameter; and
a controller that receives the signal and directs at least a portion of the exhaust stream or at least a portion of the fuel stream to the catalyst to control a regeneration operation based on a value of the system parameter sensed by the sensor, wherein the system parameter comprises a temperature of the catalyst.

7. A system for regeneration of a catalyst, comprising:
an engine that creates an exhaust stream;
a fuel supply adapted to supply a fuel stream to the engine;
a reactor that includes a catalyst and is in fluid communication with the engine to receive the exhaust stream;
a sensor that senses a system parameter and produces a signal corresponding to the system parameter; and
a controller that receives the signal and directs at least a portion of the exhaust stream or at least a portion of the fuel stream to the catalyst to control a regeneration operation based on a value of the system parameter sensed by the sensor, wherein the system parameter comprises a temperature of the exhaust stream.

8. The system according to claim 6 further comprising an electric heater configured to boost the temperature of the catalyst.

9. A system for regeneration of a catalyst, comprising:
an engine that creates an exhaust stream;
a fuel supply adapted to supply a fuel stream to the engine;
a reactor that includes a catalyst and is in fluid communication with the engine to receive the exhaust stream;
a sensor that senses a system parameter and produces a signal corresponding to the system parameter; and
a controller that receives the signal and directs at least a portion of the exhaust stream or at least a portion of the fuel stream to the catalyst to control a regeneration operation based on a value of the system parameter sensed by the sensor, wherein the controller is further configured to control a fuel injection timing of the engine.

10. A system for regeneration of a catalyst, comprising:
an engine that creates an exhaust stream;
a fuel supply adapted to supply a fuel stream to the engine;
a reactor that includes a catalyst and is in fluid communication with the engine to receive the exhaust stream;
a sensor that senses a system parameter and produces a signal corresponding to the system parameter; and
a controller that receives the signal and directs at least a portion of the exhaust stream or at least a portion of the fuel stream to the catalyst to control a regeneration operation based on a value of the system parameter sensed by the sensor, wherein the catalyst comprises a fuel conversion catalyst, a hydrocarbon-based selective catalytic reduction catalyst, or a hybrid catalyst.

11. The system according to claim 1, wherein the reactor further comprises one first reactor comprising a fuel conversion catalyst and one second reactor comprising a hydrocarbon-based selective catalytic reduction catalyst such that the fuel conversion catalyst can be configured to boost the temperature of the hydrocarbon-based selective catalytic reduction catalyst.

12. The system according to claim 1, wherein the diesel engine is disposed in a locomotive.

13. The system according to claim 1, wherein the diesel engine is disposed in an exhaust gas recirculation application.

14. The system according to claim 1, wherein the diesel engine is disposed in at least one of: an off-road diesel engine, a stationary diesel engine and a marine engine.

15. The system according to claim 9, wherein the fuel comprises a lean-burn hydrocarbon fuel.

16. A railroad locomotive comprising:
an engine that includes at least one cylinder that creates an exhaust stream;
a fuel supply adapted to supply a fuel stream to the engine;
a fuel injection system coupled to the engine and comprising at least one fuel injector, the fuel injection system configured to inject the fuel stream into the at least one cylinder;
a reactor that includes a catalyst, is in fluid communication with the engine to receive the exhaust stream;
a sensor that senses a system parameter and produces a signal corresponding to the system parameter; and
a controller that receives the signal and directs at least a portion of the exhaust stream or at least a portion of the fuel stream to the catalyst to control a regeneration operation based on a value of the system parameter sensed by the sensor.

17. The railroad locomotive according to claim 16 further comprising an electric heater configured to boost a temperature of the catalyst.

18. The railroad locomotive according to claim 16, wherein the controller is configured to control a fuel injection timing of the engine.

19. A method for regeneration of a catalyst, comprising:
supplying a fuel stream to an engine, wherein the engine comprises a diesel engine;
generating an exhaust stream from the engine, wherein the exhaust stream is generated by burning at least a portion of the fuel stream;
passing the exhaust stream over a reactor that includes a catalyst and is in fluid communication with the engine;
sensing a system parameter and producing a signal corresponding to the system parameter; and
receiving the signal and directing at least a portion of the exhaust stream or at least a portion of the fuel stream to the catalyst to control a regeneration operation based on a value of the system parameter sensed.

20. A method for regeneration of a catalyst, comprising:
supplying a fuel stream to an engine;
generating an exhaust stream from the engine, wherein the exhaust stream is generated by burning at least a portion of the fuel stream;
passing the exhaust stream over a reactor that includes a catalyst and is in fluid communication with the engine;
sensing a system parameter and producing a signal corresponding to the system parameter; and
receiving the signal and directing at least a portion of the exhaust stream or at least a portion of the fuel stream to the catalyst to control a regeneration operation based on a value of the system parameter sensed, wherein the regeneration operation comprises at least one of: beginning a regeneration cycle, ending a regeneration cycle and controlling the temperature of a catalyst.

21. A method for regeneration of a catalyst, comprising:
supplying a fuel stream to an engine;
generating an exhaust stream from the engine, wherein the exhaust stream is generated by burning at least a portion of the fuel stream;
passing the exhaust stream over a reactor that includes a catalyst and is in fluid communication with the engine;
sensing a system parameter and producing a signal corresponding to the system parameter;
receiving the signal and directing at least a portion of the exhaust stream or at least a portion of the fuel stream to the catalyst to control a regeneration operation based on a value of the system parameter sensed; and
controlling a flow of the exhaust stream.

22. The method according to claim 19, wherein the system parameter comprises a notch level of the engine.

23. The method according to claim 19, wherein the notch comprises notch two.

24. A method for regeneration of a catalyst, comprising:
supplying a fuel stream to an engine;
generating an exhaust stream from the engine, wherein the exhaust stream is generated by burning at least a portion of the fuel stream;
passing the exhaust stream over a reactor that includes a catalyst and is in fluid communication with the engine;
sensing a system parameter and producing a signal corresponding to the system parameter; and
receiving the signal and directing at least a portion of the exhaust stream or at least a portion of the fuel stream to the catalyst to control a regeneration operation based on a value of the system parameter sensed, wherein the system parameter comprises a temperature of the catalyst.

25. A method for regeneration of a catalyst, comprising:
supplying a fuel stream to an engine;
generating an exhaust stream from the engine, wherein the exhaust stream is generated by burning at least a portion of the fuel stream;
passing the exhaust stream over a reactor that includes a catalyst and is in fluid communication with the engine;
sensing a system parameter and producing a signal corresponding to the system parameter; and
receiving the signal and directing at least a portion of the exhaust stream or at least a portion of the fuel stream to the catalyst to control a regeneration operation based on a value of the system parameter sensed, wherein the system parameter comprises a temperature of the exhaust stream.

26. The method according to claim 24 further comprising heating the reactor to boost the temperature of the catalyst.

27. A method for regeneration of a catalyst, comprising:
supplying a fuel stream to an engine;
generating an exhaust stream from the engine, wherein the exhaust stream is generated by burning at least a portion of the fuel stream;
passing the exhaust stream over a reactor that includes a catalyst and is in fluid communication with the engine;
sensing a system parameter and producing a signal corresponding to the system parameter; and
receiving the signal and directing at least a portion of the exhaust stream or at least a portion of the fuel stream to the catalyst to control a regeneration operation based on a value of the system parameter sensed, wherein the catalyst comprises a fuel conversion catalyst, a hydrocarbon-based selective catalytic reduction catalyst, or a hybrid catalyst.

28. The method according to claim 19, wherein the reactor comprises one first reactor comprising a fuel conversion catalyst and one second reactor comprising a hydrocarbon-based selective catalytic reduction catalyst such that the fuel conversion catalyst can be configured to boost the temperature of the hydrocarbon-based selective catalytic reduction catalyst.

29. The system according to claim 19, wherein the diesel engine is disposed in a locomotive.

30. The method according to claim 19, wherein the diesel engine is disposed in an exhaust gas recirculation application.

31. The system according to claim 19, wherein the diesel engine comprises at least one of: an off-road diesel engine, a stationary diesel engine and a marine engine.

32. A method for regeneration of a catalyst, comprising:
supplying a fuel stream to an engine;
generating an exhaust stream from the engine, wherein the exhaust stream is generated by burning at least a portion of the fuel stream;
passing the exhaust stream over a reactor that includes a catalyst and is in fluid communication with the engine;
sensing a system parameter and producing a signal corresponding to the system parameter; and
receiving the signal and directing at least a portion of the exhaust stream or at least a portion of the fuel stream to the catalyst to control a regeneration operation based on a value of the system parameter sensed, wherein the fuel comprises a lean-burn hydrocarbon fuel.

33. A method for regeneration of a catalyst, comprising:
supplying a fuel stream to an engine;
generating an exhaust stream from the engine, wherein the exhaust stream is generated by burning at least a portion of the fuel stream;
passing the exhaust stream over a reactor that includes a catalyst and is in fluid communication with the engine;
sensing a system parameter and producing a signal corresponding to the system parameter;
receiving the signal and directing at least a portion of the exhaust stream or at least a portion of the fuel stream to the catalyst to control a regeneration operation based on a value of the system parameter sensed; and
injecting the fuel into the catalyst to raise the temperature of the catalyst to reach a light-off temperature of coke oxidation.

* * * * *

UNITED STATES PATENT AND TRADEMARK OFFICE
CERTIFICATE OF CORRECTION

| | | |
|---|---|---|
| PATENT NO. | : 7,721,532 B2 | Page 1 of 1 |
| APPLICATION NO. | : 11/172642 | |
| DATED | : May 25, 2010 | |
| INVENTOR(S) | : Liu et al. | |

It is certified that error appears in the above-identified patent and that said Letters Patent is hereby corrected as shown below:

IN THE SPECIFICATION

In Column 2, Line 9, delete "sensed" and insert -- sensed. --, therefor.

In Column 5, Line 55, delete "shown." and insert -- shown). --, therefor.

IN THE CLAIMS

In Column 12, Line 33, in Claim 23, delete "19," and insert -- 22, --, therefor.

Signed and Sealed this
Twelfth Day of July, 2011

David J. Kappos
*Director of the United States Patent and Trademark Office*